April 11, 1933.　　F. W. BRINTNALL　　1,903,618
PLAIT FORMING APPARATUS
Filed May 16, 1928　　5 Sheets-Sheet 1

INVENTOR
Frank W. Brintnall
BY
ATTORNEY

Patented Apr. 11, 1933

1,903,618

UNITED STATES PATENT OFFICE

FRANK W. BRINTNALL, OF DETROIT, MICHIGAN, ASSIGNOR, BY MESNE ASSIGNMENTS, TO NATIONAL AUTOMOTIVE FIBRES, INC., OF WILMINGTON, DELAWARE, A CORPORATION OF DELAWARE

PLAIT FORMING APPARATUS

Application filed May 16, 1928. Serial No. 278,234.

The invention primarily has for its object to provide a novel apparatus to form flaccid material such as cloth, leather or the like into plaits of trough-like shape with intervening inverted U-shaped fabric-ridges (for the seams), the said apparatus being adapted to efficiently act on short length pieces, fed to it by hand or otherwise, as well as on continuous lengths of material fed from rolls.

The invention more particularly has for its object to provide a new and improved plait forming apparatus adaptable to use on machines for mechanically manufacturing tubular upholstery cushions and is particularly adapted to use on machines of the character disclosed in my Patent No. 1,779,900, issued October 28, 1930.

In the machine of the application referred to facing material is fed from a continuous length roll onto a smooth table and between a cooperative arrangement of upstanding stationary ribs and upwardly removable forming troughs to be formed into a series of parallel plaits or troughs separated by upstanding seams. After the forming of plaits in the facing material a lining material, fed from a continuous length roll and over a forming drum, is laid over the facing material plaits in such a manner as to form upholstery material receiving tubes between the said facing and lining materials into which suitable upholstery pipe bats are fed to complete the forming of the cushions. Strips of batting, or wadding, are fed to the plaits and suitable sewing mechanisms then sew through the upstanding ribs of the lining and facing material to secure the component parts together and complete the manufacture of the cushions as shown in my above patent.

It is to provide a more conveniently and efficiently operable facing material forming means or apparatus that my present invention is designed. In the machine of the patent above referred to feed chains and resilient clamp plates were employed to engage the edges of the facing material to feed it along and hold it taut while permitting the necessary ingathering or take-up in the material incident to the forming operation. Each time a new piece of material was inserted into the machine the forming troughs and drum had to be elevated and the advance end of the material laid over the upstanding ribs. Also, the edge clamp plates have to be partially removed and replaced to clamp the material edges to the feeder chains.

Thus short or cut lengths of facing material cannot be fed through the machine practically and great inconvenience and delay is occasioned each time a new piece of material is fed into the machine.

The forming apparatus herein disclosed is particularly adapted to use on the machine above referred to and will not only operate conveniently and efficiently on sort cut pieces as well as rolled lengths but will obviate the necessity of part adjustment and removal of parts and the other difficulties above enumerated with reference to the machine of the patent.

In its more detailed nature the invention comprises a plurality of parallel spaced feeder chains having upstanding travelling ribs, and a plurality of forming troughs arranged in parallel relation and spaced far enough apart to allow for passage of the chain ribs and the plait dividing seams formed by the chain ribs in the said spaces. The forming troughs are secured together upon a suitable frame to provide a stationary former unit, and the frame is mountable upon any cushion making machine upon which the former unit is adaptable to use. The forming troughs are of successively decreasing length so that the material is fed to the troughs individually in progressive sequence, and individual progressive sequential formation of the plaits is thereby provided for.

A further structural feature of the forming unit resides in the provision of a peculiarly constructed receiving end on each trough designed to facilitate reception of the advancing material to be formed and to provide for the forming of the lateral plait defining edges of the several plaits individually in progressive sequence.

A further feature of the invention is the provision of a novel means to frictionally engage the edges of the material beyond the forming unit to apply a tensioning drag thereto to assist in the proper feeding of the material through the forming unit and to hold the same relatively taut and assure smooth feeding.

With the above and other objects in view that will hereinafter appear, the invention further resides in the novel details of construction, combination and arrangement of parts, all of which will be first fully described in the following detailed description, then be particularly pointed out in the appended claims, reference being had to the accompanying drawings, in which:

Figure 1:
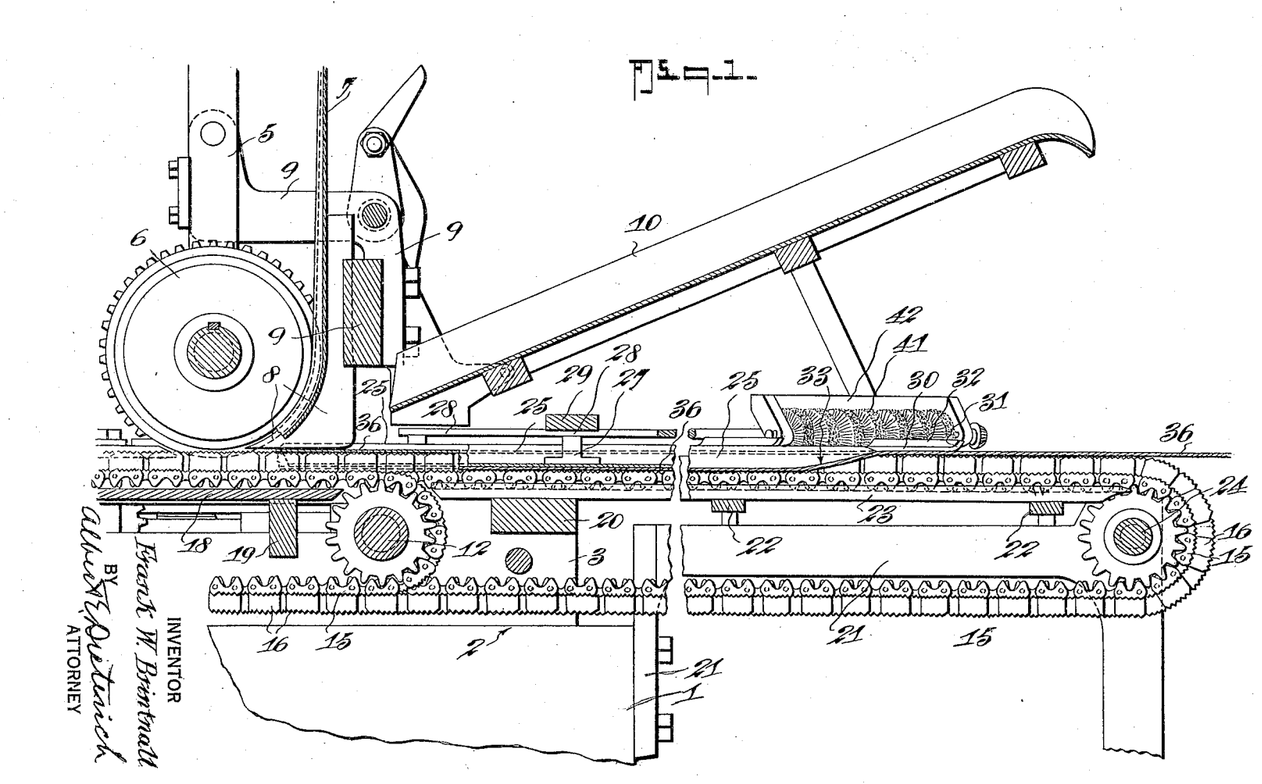
Figure 1 is a vertical longitudinal section of so much of an upholstery cushion forming machine as is necessary to illustrate the application of the invention, parts being broken away.
Figure 2:
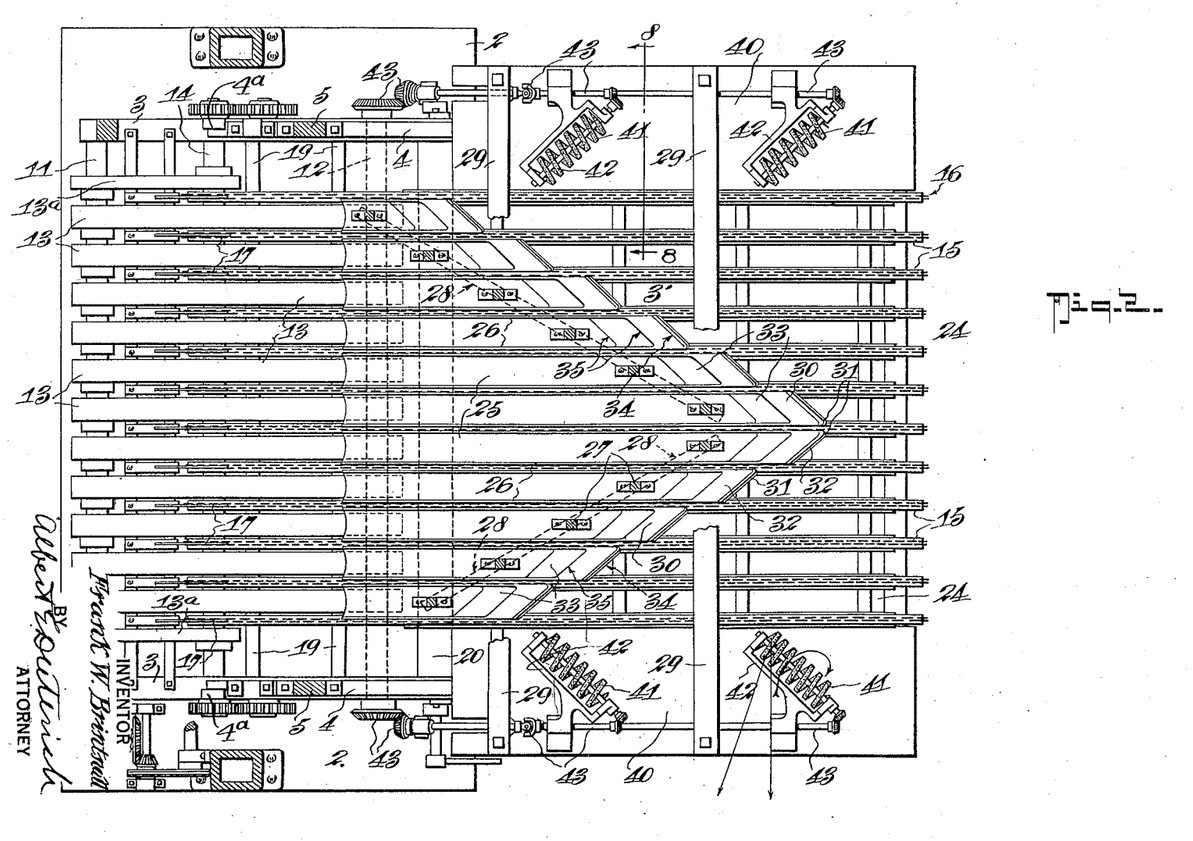
Figure 2 is a horizontal section of the cushion forming machine and illustrates the invention in plan view positioned for use, the section being taken on a plane just above the improved plait former which constitutes the invention.

In the drawings, in which like numerals of reference indicate like parts in all of the figures, 1 designates the main frame of the cushion making machine, upon the table face or bed 2 of which the side sills 3 of the framing superstructure are mounted, see Figures 1 and 2. Portions 4 of the sills 3 are pivoted or hingedly mounted at 4ª so that they may be moved or adjusted upwardly, and said portions carry standards 5 which serve to rotatably support the lining material forming drum 6. The lining material is indicated at 7 and the fins which cooperate with the drums and form the said material are indicated at 8 and are carried by the frame 9 which is upwardly movably mounted on the standards 5 and also serves to carry the advance end of the padding trough unit 10.

Cross shafts 11 and 12 are rotatably mounted in the sills 3 and are equipped with sprockets over which the feed chains 13 travel, and the said sills also serve to rotatably mount an intermediate cross shaft 14 equipped with sprockets and rotated in unison with the shaft 11 through the medium of the transmission chains 13a. The advance ends of the feeding and forming chains 15 (fabric-rib formers) take over the sprockets on the intermediate shaft 14, which said chains are provided with outwardly projected spacing ribs or fingers 16 between which blades or fins 17 project at the advance ends of the chains for a purpose clearly set out in an application for patent soon to be referred to.

The chains pass over a suitable table 18 supported at 19 on the sills 3 and the said sills are also joined at their rear ends by a cross beam 20 which serves a purpose later to be described.

All of the above mentioned parts are disclosed in detail in my Patent No. 1,779,900.

As described in the above-mentioned patent, the forming-device 6, which is provided with grooves, or spaces, through which the forming-chains, or forming-ribs, 15 extend, is suitably driven. This may be accomplished by any suitable means (not shown).

In the practical development of my present invention I provide the machine frame with an extension frame 21, upon the cross bars 22 of which and upon the cross beam 20 grooved longitudinal tracks 23 are mounted which serve as guide tracks for the upper flights of extended portions of the feeding and forming chains 15.

A plurality of shallow U-shaped troughs 25 are provided and positioned in parallel relation spaced from each other as at 26 the distance being sufficient to permit free passage of the ribs or fingers 16 of the chains 15 and of the seam material 37 forced up between the troughs by the said ribs in the manner and for the purpose soon to be described. The troughs are secured by depending brackets 27 to diagonals 28 which are in turn secured to cross bars 29 suitably supported upon the machine framing, see Figures 1, 2, 3 and 5.

The troughs 25 are constructed and arranged in a peculiar manner so that the material may be formed into plaits, as to cross sectional area, in progressive sequence laterally in a manner overcoming any tendency to set up opposed directional strains such as would tend to tear or weaken the material and at the same time to provide for proper tensioning of the material so as to overcome all tendency to drag and wrinkle.

To accomplish the above purpose each trough, with the exception of two centrally disposed troughs, is made shorter than the adjacent trough toward the center so that the material in passing to the machine will be caused to engage the central pair of troughs first and then each succeeding trough in lateral directions individually. See Figures 2 and 3.

Figure 3:
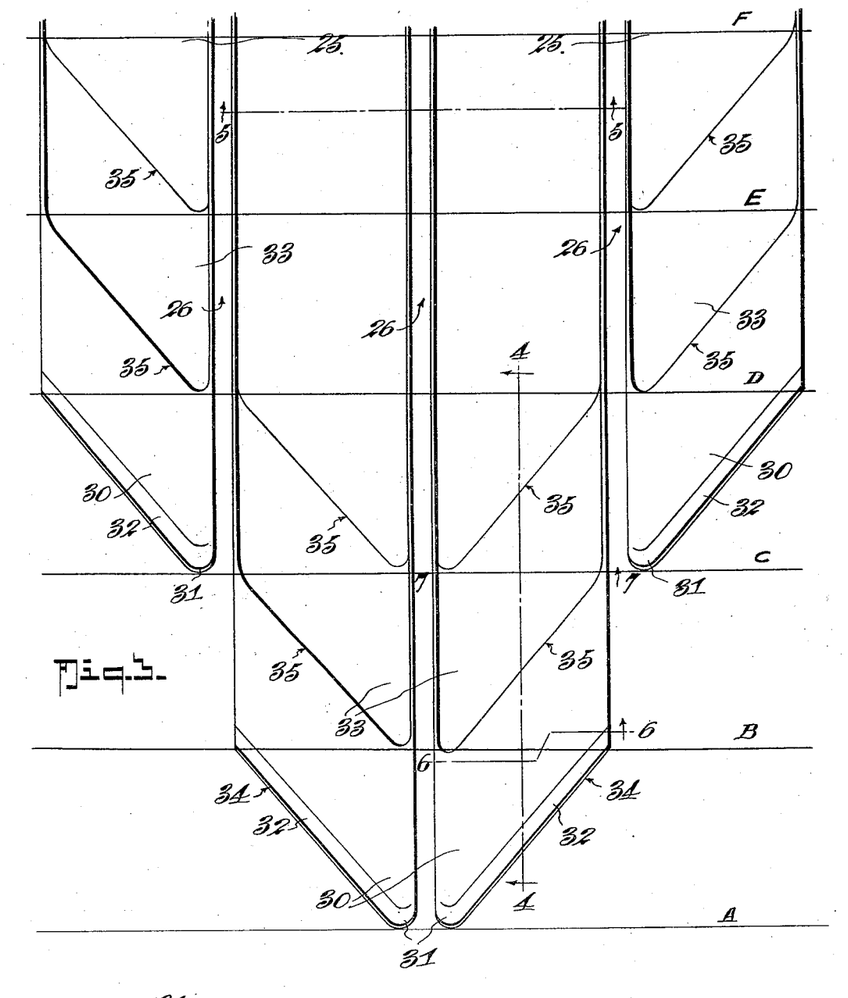
Figure 3 is a fragmentary plan view illustrating the advance or receiving ends of several of the central forming troughs.
Figure 4:
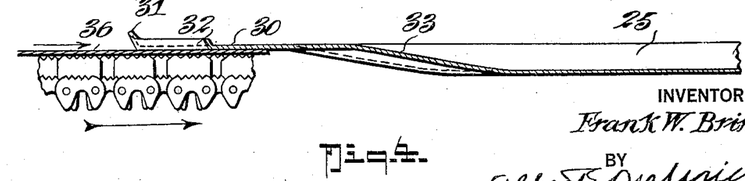
Figure 4 is a detail longitudinal section taken on the line 4—4 on Figure 3.
Figure 5:
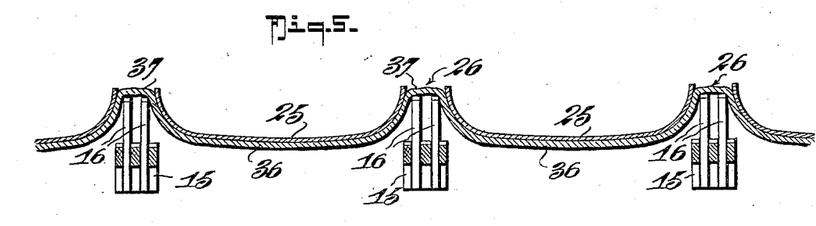
Figure 5 is a vertical cross section taken across several forming troughs as indicated at line 5—5 of Fig. 3 and illustrates the relation of the feeder chains.

In Figure 3 of the drawings I have illustrated the advance ends of the two central troughs 25 and the similar end of the succeeding trough at each side of the central troughs and from this figure, considered in connection with Figures 2 and 4 of the drawings especially, the peculiar shape of the advance ends of the troughs will be readily understood.

Figures 6, 7:
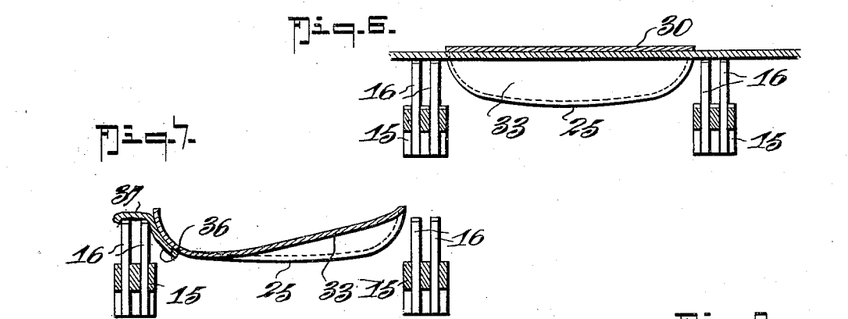
Figure 6 is a detail vertical cross section taken on the line 6—6 on Figure 3, the dotted lines indicating the changes in cross sectional shape from the line on which the section is taken back to the line C on Figure 3.
Figure 7 is a detail vertical cross section taken on the line 7—7 on Figure 3, the dotted lines indicating the changes in cross sectional shape from the line on which the section is taken back to the line D on Figure 3.
Figure 8:
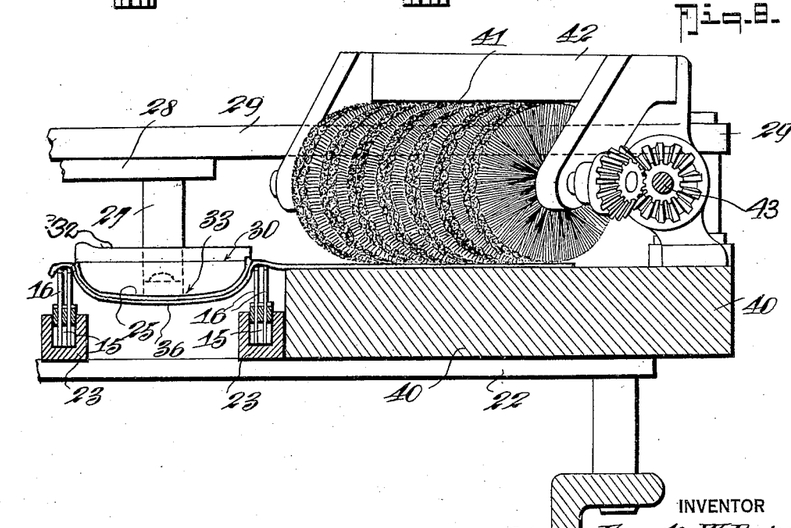
Figure 8 is a fragmentary vertical cross section taken on the line 8—8 on Figure 2.

Each trough is provided with a flat receiving end on a level with the upturned edges of the troughs and positioned on a plane for receiving the advance edge of the material as it lies across the top edges of the chain projections 16, see Figures 4 and 6. To assure proper feeding of the advance edge of the material under the flat portion 30, the said portion is provided with an upturned nose 31 and an upturned receiving edge 32. The flat portions 30 merge through the downwardly inclined portions or depressions 33 with the bottom of the trough and it is this inclined portion of the trough which provides for the depression of the material between the upstanding ribs 16 of the chains to conform to the shape of the bottom of the trough in the manner illustrated in Figures 5 and 8 of the drawings.

It will be observed by reference to Figures 2 and 3 of the drawings that the advance edge of the flat portions 30 are angled forwardly-laterally as at 34 in opposite directions from the central space 26 and the inclined or depressed portions 33 are similarly angled as at 35 forming a diagonal ramp in each trough. On Figure 3 equi-distantly spaced lines A, B, C, D, E and F are drawn to indicate the successive acting relations of the diagonal ramp portions of the troughs. The ramps are arranged in echelon with the rear end portion of an advanced ramp in line with the front end portion of the next succeeding ramp so that the depressed portions 33 of the troughs will be effective successively.

In the drawings the former unit comprised by the troughs 25 and the frame which carries them is composed of eleven troughs, six at one side of the central space and five at the other. It is to be understood, of course, that as many troughs 25 as may be desired may be secured together upon suitable framing as a unitary structure, the relative arrangement disclosed in the drawings being retained.

Figures 9, 10, 11, 12:
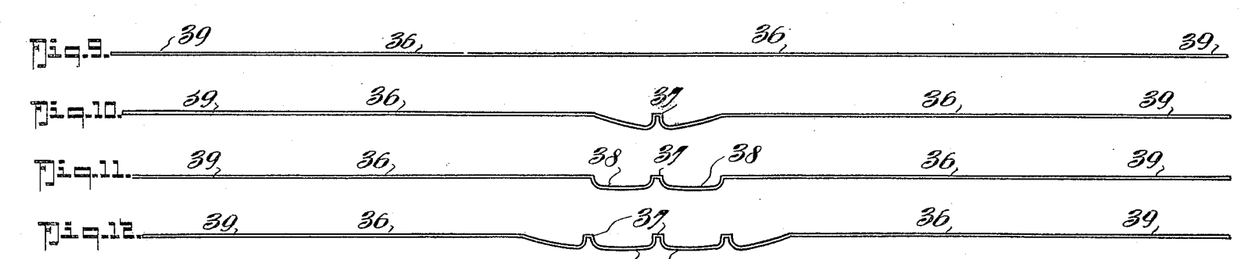
Figures 9 to 21 inclusive are diagrammatic edge views illustrating a width of material being formed, the first figure illustrating the normal spread of the sheet before reaching the former and each successive figure illustrating a successive individual and sequential step in the forming of the sheet into plaits, Figure 21 illustrating the last step in the forming process or the final formed shape of the sheet.
Figures 20, 21:
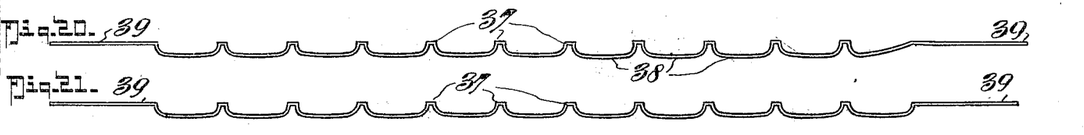

In Figures 9 to 21 inclusive I have disclosed the manner of forming the material step by step from the original sheet disclosed diagrammatically in Figure 9 to the completely formed sheet diagrammatically indicated in Figure 21, the said figures disclosing the steps necessary toward the completion by the forming unit comprising the number of troughs shown in Figure 2. If the sheet shown in cross section in Figure 9 is being fed by hand it is fed so that its center portion will be centered on the most centrally disposed space 26 illustrated in Figure 3 of the drawings and if the said sheet is being fed from a roll that roll is positioned upon the machine framing to so engage the forming troughs. As the sheet passes along on the lugs 16 of the chains 15 its center portion will pass under the flat portions 30 of the advance former units and will retain its flat shape in passing from lines A to B. In passing from lines B to C both walls of the central seam will be formed simultaneously as indicated in Figure 10. In the drawings the material is indicated at 36, the seams at 37 and the plaits formed between the seams at 38.

The forming of the center plait 37 in the manner indicated in Figure 10 will cause an ingathering of the material occasioned by the depression of the central portions thereof as indicated in the said figure, the said ingathering taking place from each edge inwardly toward the center plait.

The next step in the forming process takes place while the material is passing from the line C to the line D in Figure 3, during which travel it passes under the flat ends of the pair of troughs positioned one at each side of the central troughs first above referred to but is not acted on by the said last named troughs in any manner. During this travel from lines C to D the two center-most plaits are completed as indicated in Figure 11. causing an additional ingathering of the material but in one direction only at each side, namely from the edge in toward the center. Thus it will be observed that in forming the two central plaits the two walls comprising the innermost seam were formed simultaneously whilst the outermost walls necessary to complete the plaits were not formed until the inner head travelled from C to D.

Figures 13, 14, 15, 16, 17:
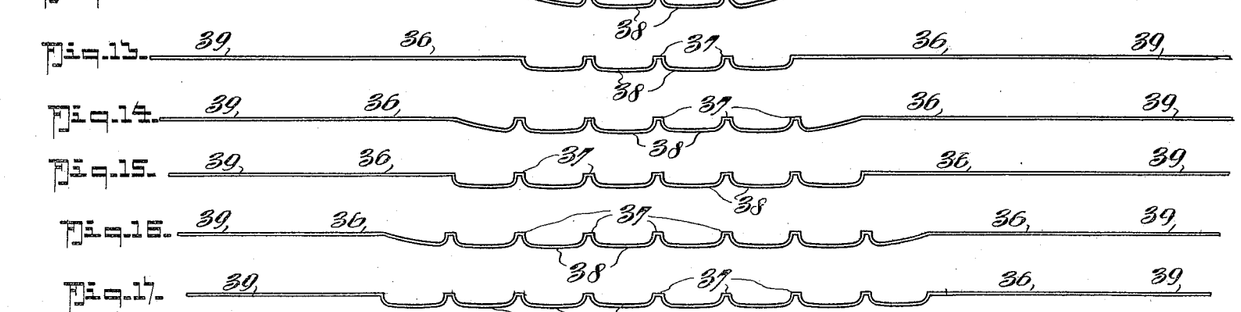
Figures 18, 19:
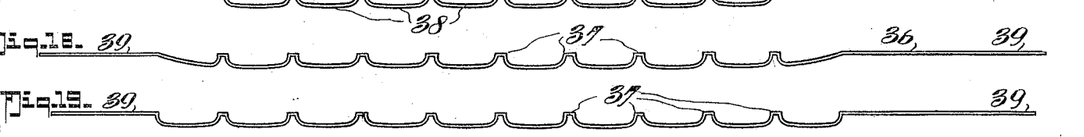

In passing from D to E the seam at each side of the medial seam is completed and one-half of the plait defined at one side would be also completed. In passing from the point E to the point F the remaining portion of the plait just mentioned is completed. See Figures 12 and 13.

In this manner the plaits are not only formed in progressive sequence laterally but each side or defining wall of the plaits is formed in progressive sequence laterally, the successive stages of the formation process being disclosed in the remaining diagrammatic Figures 14 to 21. This arrangement assures smooth feeding of the material through the former and provides for just the proper tension during the forming action and by reason of the fact that all ingathering or take-up of the material is directed in one direction at each side, namely from the lateral edge inwardly toward the center, no opposing directional strains are imparted to the material as would be the case if it was attempted to form all of the plaits simultaneously by a depressing action.

In forming upholstery cushions a predetermined surplus is allowed at each lateral edge thereof to provide for securing of the cushion to the framing to be upholstered and this surplus, or edge extension, is indicated at 39.

Suitable edge tables 40 are supported along the edges of the machine framing over which the edges 39 of the material extend and travel, and on each table 40 one or more rotary drag brushes 41 are mounted in suitable brackets 42 carried by the framing and to which rotation is imparted by any improved means as for example the connections 43 with cross shaft 12. The brushes rotate in the direction indicated by the arrow on Figure 2 of the drawings and impart a drag to the lateral edges of the material outwardly and forwardly as indicated by other arrows on the said figure, thus serving to hold the material relatively taut against any tendency to wrinkle without interfering with the proper travel of the material into the machine.

In the foregoing description I have disclosed a simple forming unit which may be employed on the particular machine disclosed in the patent referred to or any other machine adaptable to the purpose of that particular machine and in which the material fed in short pieces by hand or from continuous length rolls is efficiently formed without subjecting it to damaging strains and without danger of wrinkling or creasing the same.

It may be added that the seam-ridges 37 of the finish-fabric are brought into nested relation with respect to the seam-ridges formed in the lining fabric when the fabrics pass under the drum or forming-roll 6, the grooves of which accommodate the ridge-chains 15. The nested seam-ridges then ride over the fins 17 to the sewing-mechanisms (not shown). The ridge-chains, as appears from Figs. 2 and 5, constitute spaced ribs in the bed of the machine over which the seam-ridges are formed. Against these ribs the fabric is pressed by the curved lateral edge-portions of the shoes or formers 25 as the fabric is fed through the machine.

From the foregoing description, taken in connection with the accompanying drawings, it is thought that the novel details of construction, the manner of use and the advantages of my invention will be readily apparent to those skilled in the art to which it relates.

No undue limitations should be understood from the detailed description given, but the appended claims should be construed as broadly as permissible in view of the prior art.

What I claim is:

1. In plait forming apparatus, the combination of means to feed the material-to-be-formed longitudinally, means to form the material into plaits in progressive sequence laterally as it is being fed, and a rotatable body to engage at least one edge of the material to hold the material relatively taut while being formed, said body comprising a rotating brush arranged to impart an outward and forwardly directed drag to the said material edge.

2. Apparatus to form a sheet of flaccid material into a plurality of plaits each comprising a base portion and upstanding confining edges forming a trough-like plait, said apparatus comprising a plurality of equi-distantly spaced feeder chains having material engaging portions, and a plurality of forming bodies one between each adjacent pair of chains, said bodies each having a receiving end including a gradual depression portion to press the material between the chains to the desired shape, the said gradual depression portions of the various bodies being stepped back successively laterally whereby the plaits are shaped by the said depressions in progressive sequence laterally.

3. Apparatus to form a sheet of flaccid material into a plurality of plaits each comprising a base portion and upstanding confining edges forming a trough-like plait, said apparatus comprising a plurality of equi-distantly spaced feeder chains having material engaging portions, and a plurality of forming bodies one between each adjacent pair of chains, said bodies each having a receiving end including a gradual depression portion to press the material between the chains to the desired shape, the said gradual depressions of the various bodies being stepped back successively laterally whereby the plaits are shaped by the said depressions in progressive sequence laterally, and said depression portions being angularly positioned relatively to the direction of travel of the chains whereby the confining edges of the plaits themselves are formed in progressive sequence laterally.

4. Apparatus to form a sheet of flaccid material into a plurality of plaits each comprising a base portion and upstanding confining edges forming a trough-like plait, said apparatus comprising a plurality of equi-distantly spaced feeder chains having material engaging portions, and a plurality of forming bodies one between each adjacent pair of chains, said bodies each having a receiving end including a gradual depression portion to press the material between the chains to the desired shape, the said gradual depression portions of the various bodies being stepped back successively laterally from each side of an intermediate position whereby the plaits are shaped by the said depression portions in progressive sequence laterally from each side of said intermediate position, and said depression portions being angularly positioned relatively to the direction of travel of the chains whereby the confining edges of the plaits themselves are similarly formed in progressive sequence laterally.

5. In mechanism of the character set forth: a bed having spaced forming-ribs and intervening plait-spaces; means for feeding a fabric thereover; and means cooperating with said forming-ribs to form fabric-ridges and intervening depressed plait-fullnesses, said last-mentioned means comprising devices serving to form the material into plaits in progressive sequence laterally from the medial portion and to form the inner-confining edge of each plait in advance of the formation of the outer-confining edge thereof.

6. Mechanism as specified in claim 5, in which the means cooperating with said forming-ribs comprises fabric-ironing shoes intervening between the forming-ribs, the receiving ends of the intermediate shoes occupying an advance position, and the receiving ends of the remaining shoes occupying progressively retracted positions, the receiving ends of the shoes presenting oblique edges and bevelled lower surfaces.

7. In an upholstery machine: means for forming a fabric into seam-ridges extending longitudinally thereof and intervening plait-fullnesses, said means operating first on one portion of the fabric and then operating laterally and progressively to another portion thereof; means for forming seam-ridges in a second fabric; a forming-roll having grooves for nesting the seam-ridges of one fabric in the seam ridges of the other; means for rotating said roll; and means for feeding wadding into said plait fullnesses.

8. In combination: a bed having longitudinal forming-ribs spaced to accommodate plait fullnesses between them; means for feeding a fabric thereover; means co-operating with said forming-ribs to form seam ridges and intervening depressed plait fullnesses, said forming-ribs and the means co-operating therewith functioning first on the medial portion of the fabric and then progressively laterally from said medial portion, said co-operating means comprising fixed forming members between the forming-ribs and provided with edge-portions adapted to press the fabric against the forming-ribs to form said seam ridges in the fabric.

9. In mechanism of the character set forth; a bed having longitudinal forming-ribs and intervening plait-spaces; means for feeding a fabric longitudinally over said bed; means operatively engaging the lateral edge portions of the fabric and tending to yieldingly hold the fabric taut transversely; means co-operating with said forming-ribs serving to depress the fabric into the spaces between the forming-ribs and form plaits and intervening seam-ridges, said co-operating means functioning to form first medial plaits and then the remaining plaits in progressive sequence laterally; means for forming plait-covering portions and intervening seam-ridges in a second fabric; means for nesting the seam-ridges of the first fabric in the seam ridges of the second fabric; and means for guiding wadding into the plaits.

10. In mechanism of the character set forth: a bed having longitudinal forming-ribs and intervening plait-spaces; means for feeding a fabric longitudinally over said bed; means operatively engaging the lateral edge portions of the fabric and tending to yieldingly hold the fabric taut transversely, the last mentioned means comprising a driven device which serves to exert a yielding lateral tension effect upon the fabric while permitting ingathering of the fabric; and means co-operating with said forming-ribs to depress the fabric into the spaces between the forming-ribs and thereby form plaits and intervening seam-ridges, said co-operating means functioning to form first medial plaits and then the remaining plaits in progressive sequence laterally.

11. In combination: a bed over which a fabric may be fed, said bed having longitudinal forming-ribs spaced to accommodate plait-fullnesses between them; means co-operating with said ribs to form raised seam-portions and intervening plait-fullnesses in said fabric first at a medial portion thereof and then progressively in both directions laterally from said medial portion; a forming-device mounted above said bed serving to form a second fabric, said forming-device having spaces through which the seam-portions of the first fabric may pass and said forming ribs extending through said spaces; and means for conducting wadding-strips between the fabrics and into said plait-fullnesses, whereby said fabrics and the wadding-strips are then passed between the bed and the forming-device for said second-mentioned fabric.

12. A machine as specified in claim 11, in which members are provided adjacent said forming-device which engage the second-mentioned fabric and co-operate with said forming-device in forming the second-mentioned fabric as it passes beneath the forming-device into position to overlie the stuffed, plaited, first-mentioned fabric.

13. In combination: a bed having longitudinal forming-ribs spaced to accommodate plait-fullnesses between them; means for feeding a fabric thereover; means co-operating with said forming-ribs to form fabric-ridges, and intervening depressed plait-fullnesses, said forming-ribs and the means co-operating therewith functioning first on the medial portion of the fabric and then progressively laterally from said medial portion; and a forming-roll provided with peripheral grooves which register with said forming-ribs, and means co-operating with said forming-roll to form seam-ridges in a second fabric, which receive in nested relation the seam-ridges of the first fabric.

FRANK W. BRINTNALL.